(12) United States Patent
Schmidt et al.

(10) Patent No.: US 9,211,843 B2
(45) Date of Patent: Dec. 15, 2015

(54) ASSEMBLY FOR STORING OBJECTS IN THE CABIN OF A VEHICLE

(75) Inventors: Karsten Schmidt, Hamburg (DE); Bjoern Wandmaker, Tellingstedt (DE)

(73) Assignee: Airbus Operations GmbH (DE)

( * ) Notice: Subject to any disclaimer, the term of this patent is extended or adjusted under 35 U.S.C. 154(b) by 1256 days.

(21) Appl. No.: 12/474,469

(22) Filed: May 29, 2009

(65) Prior Publication Data

US 2009/0294585 A1 Dec. 3, 2009

Related U.S. Application Data

(60) Provisional application No. 61/130,398, filed on May 30, 2008.

(30) Foreign Application Priority Data

May 30, 2008 (DE) .......................... 10 2008 026 116

(51) Int. Cl.
*B64D 47/00* (2006.01)
*B60R 7/02* (2006.01)
*B64D 11/00* (2006.01)

(52) U.S. Cl.
CPC .............. *B60R 7/02* (2013.01); *B64D 11/003* (2013.01); *B64D 2231/025* (2013.01)

(58) Field of Classification Search
CPC ................ B65D 11/1873; B65D 7/24; B65D 2519/00273; B64D 9/00; B64D 11/003; A47B 95/008; A47B 67/02
USPC .............. 220/529, 540, 541, 23.87, 542, 543, 220/544, 545, 546, 548, 549, 550, 213, 532, 220/533, 534, 531, 4.32, 528, 4.33; 244/118.1, 118.5, 118.2; 296/24.3; 312/245, 237, 236, 334.31, 9.3, 119, 312/122, 131, 132, 261, 260, 350
See application file for complete search history.

(56) References Cited

U.S. PATENT DOCUMENTS

| | | | | | |
|---|---|---|---|---|---|
| 4,023,874 | A | * | 5/1977 | Jong et al. ..................... | 312/291 |
| 4,609,166 | A | * | 9/1986 | Brennan .................... | 244/118.5 |
| 4,911,296 | A | * | 3/1990 | Hart, Jr. ........................ | 206/373 |
| 5,167,433 | A | | 12/1992 | Ryan | |
| 5,549,258 | A | * | 8/1996 | Hart et al. .................. | 244/118.1 |
| 5,584,412 | A | * | 12/1996 | Wang ............................ | 220/500 |
| 5,626,380 | A | * | 5/1997 | Elson et al. .................. | 296/39.1 |
| 5,716,027 | A | * | 2/1998 | Hart et al. .................. | 244/118.1 |

(Continued)

FOREIGN PATENT DOCUMENTS

DE 100 63 190 A1 6/2002

*Primary Examiner* — Jacob K Ackun
*Assistant Examiner* — Jenine Pagan
(74) *Attorney, Agent, or Firm* — Lerner, David, Littenberg, Krumholz & Mentlik, LLP

(57) ABSTRACT

The invention relates to an assembly for storing objects in the cabin of a vehicle, comprising at least one frame with attachment means, and at least one holding device for mounting the objects, wherein the frame has a contour that, at least in some regions, essentially corresponds to the interior contour of a storage container so that the frame can be arranged in the storage container and can be attached in the storage container with the use of the attachment means, and wherein the holding device can be removably stored in the frame. The assembly according to the invention can be placed in a preassembled state in the vehicle, thus reducing the time required for installation and maintenance, while at the same time making better use of the available space.

11 Claims, 3 Drawing Sheets

(56) References Cited

U.S. PATENT DOCUMENTS

| | | | |
|---|---|---|---|
| 5,890,544 A * | 4/1999 | Love et al. | 169/51 |
| 5,890,612 A * | 4/1999 | Coppi | 220/7 |
| 6,474,731 B2 * | 11/2002 | De Gaillard | 296/220.01 |
| 6,497,386 B2 * | 12/2002 | Martinez | 244/118.5 |
| 6,719,347 B2 * | 4/2004 | Gehring et al. | 296/37.5 |
| 6,851,735 B2 * | 2/2005 | Hicks et al. | 296/37.1 |
| 2002/0000733 A1 * | 1/2002 | Ryan | 296/37.1 |
| 2007/0159035 A1 * | 7/2007 | Mullen | 312/245 |

* cited by examiner

ASSEMBLY FOR STORING OBJECTS IN THE CABIN OF A VEHICLE

CROSS-REFERENCE TO RELATED APPLICATIONS

This application claims the benefit of the filing date of U.S. Provisional Patent Application No. 61/130,398 filed May 30, 2008, the disclosure of which application is hereby incorporated herein by reference.

BACKGROUND OF THE INVENTION

The invention relates to an assembly for storing objects in the cabin of a vehicle.

Usually, in a vehicle, in particular in aircraft or passenger aircraft, storage containers in the form of storage compartments are available, in which various items may be stored. Such items are, in particular, passenger hand baggage, as well as blankets, pillows and the like. Usually, items of emergency equipment are also stored in storage compartments, for example in overhead storage compartments or hatracks, so that they may be easily reached and removed by cabin crew.

At present, items of emergency equipment, for example fire extinguishers, defibrillators, oxygen bottles and the like, are installed on adapter panels by way of corresponding mounting devices, which in turn, by means of screws, are attached to one or several bottoms or sidewalls of storage compartments with the use of threaded bushes. For neat demarcation of a storage region for items of emergency equipment from a storage region for passenger baggage, usually partition walls are incorporated in the storage compartment. In order to ensure impeccable accessibility to the emergency equipment, a correspondingly large distance among items of emergency equipment must be observed.

Such widely-used arrangements are associated with a disadvantage in that pre-assembly of the corresponding mounting devices outside the vehicle or outside the aircraft is not possible. Consequently, during assembly or maintenance of the aircraft and of the items of emergency equipment, the down time of the aircraft is extended, because, in an involved process, the adapter panels need to be screwed into the corresponding storage compartments, and in those locations the items of emergency equipment need to be attached. The time-consuming process is, in particular, due to the necessity of tightening a multitude of attachment screws. A further disadvantage is due to the very considerable space requirements for the emergency equipment because of the specified accessibility, which space requirement in turn reduces the space that is available for passenger baggage.

BRIEF SUMMARY OF THE INVENTION

It may be an object of the invention to propose an assembly for storing objects in the cabin of a vehicle, which assembly may be preassembled outside the vehicle so that the down time of the vehicle during maintenance and installation may be minimised. It may be a further object of the invention to propose such an assembly, which requires as little space as possible.

The object may be met by an assembly for storing objects, by the use of such an assembly, and by an aircraft comprising at least one such assembly according to the independent claims. Advantageous improvements are set out in the subordinate claims.

The assembly, according to the invention, for storing objects in the cabin of a vehicle comprises at least one frame and at least one holding device for mounting the objects, wherein the frame has a contour that, at least in some regions, essentially corresponds to the interior contour of a storage container so that said frame may be arranged and attached in the storage container with the use of attachment means, and wherein said holding device may be removably stored in the frame.

The assembly according to the invention may make it possible to store objects in a storage container of a vehicle, which storage container is preferably already present in the cabin of the vehicle, and whose original purpose, for example, is the storage of baggage or the like. In a cabin of an aircraft, usually a large number of hatracks are present, which are also covered by the term storage container. The holding device of the assembly according to the invention serves the purpose of storing various objects, in particular items of emergency equipment. In order to ensure quick and easy access, these objects should, if at all possible, be arranged at defined positions on or in the holding device so as to be spaced apart from each other.

The assembly according to the invention is advantageous when compared to arrangements of the state of the art, because a preassembled frame may be inserted into a correspondingly prepared storage container, for example by means of quick-acting closures, snap-connections or the like, thus making it unnecessary to install holding devices directly on or in the storage container, and also making it unnecessary to subsequently equip said holding devices with the items of equipment that are to be stored. Accordingly there is no need, in a time-consuming manner, to attach mounting devices in the storage containers, on which mounting devices adapter panels or the like have to be arranged that will subsequently have to be equipped with objects. Holding devices that are fully equipped with the objects to be stored may be inserted, latched, snapped or the like in or into the frame that is arranged in the storage container. As a result of this modular assembly according to the invention, the down time of the vehicle during its assembly, equipment installation or maintenance may be reduced, and consequently the direct costs of the respective procedure may be reduced.

In an advantageous improvement of the assembly according to the invention, the holding device may be removed from the frame without the use of tools. This results in significantly faster integration of the holding device and thus of the items of equipment to be stored in the storage container if instead of tools, only manual locking means or the like are used.

In an advantageous improvement of the assembly according to the invention, in the frame, means for slidably and/or swivellably storing the holding device as well as at least one means for locking down the holding device are arranged. The holding devices may thus, for example, be equipped with items of equipment and may be inserted in the frame of the assembly according to the invention. As a result of slidably or swivellably storing the holding device it is possible to equip even those regions of the holding device that are located in the rear region of the storage container and accordingly are difficult to access from a position in front of the storage container. This is the case in particular when the storage container is arranged at eye level or higher within the cabin. By swinging out or pulling out the holding device, the items of equipment may be reached in a rear region of the holding device or of the storage container, without this requiring auxiliary means, for example a stepladder or the like, which auxiliary means in turn take up storage space when not in use. Accordingly, the available space in the storage compartment may be utilised better so that in the storage container a larger region remains free for the originally intended use by items of baggage or similar.

The means for locking down the holding devices are, for example, to be arranged on the frame and should prevent a holding device from independently moving from a storage position to an extended position while the vehicle is in operation, or, for example in closed storage containers, during lateral movements of the vehicle, from repeatedly knocking against a lid.

In a particularly preferred embodiment of the assembly according to the invention the means for locking down the holding device is a locking bar that may be rotatable or swivellable on an axis, which locking bar in a lock-down position projects into the slide region or swivel region of the holding device, thus preventing any movement of the holding device. The movement of the locking bar could, for example, be designed so as to be rotary-angle-limited. The locking bar could, for example, comprise a borehole, by means of which borehole catching on a snap-connection pin is made possible, or which borehole makes it possible to insert a screw for screwing into the frame. Furthermore, the locking bar preferably rotates on this borehole, which defines the axis for rotating the locking bar. The locking bar locks the holding device down in a lock-down position because it projects into the movement space of the holding device, which movement space is defined by a slide region if the holding device is implemented as a drawer-like element, or by a swivel region if the holding device is swivellable. In a release position the locking bar no longer projects into the slide region or the swivel region, but instead releases the holding device so that it may be pulled out or swivelled out. For example, the locking bar could lock the holding device down in a vertical position, and release the holding device for pulling out or swivelling out in a horizontal position, i.e. essentially rotated on the axis by 90°.

In a particularly preferred embodiment of the assembly according to the invention, the means for the slidable and/or swivellable storing of the holding device may be designed as one or several linear guides. This results in the holding device being shaped in the manner of a drawer. It is not mandatory for the linear guides to be aligned parallel to the floor of a cabin of the vehicle, instead they could also be arranged in an oblique angle to said floor. This could, for example, prevent independent movement of the holding device if the linear guides are aligned in such a way that due to gravitational force the holding device would move into the storage container.

Furthermore, in a preferred embodiment of the assembly according to the invention, the holding device may be designed as a panel-shaped component. This construction is particularly simple and economical because there is no need to produce complex shapes. In particular when it is used in an aircraft, in this way generally available sandwich structures that are very light in weight may be used to produce a holding device. Furthermore, panel-shaped holding devices may be affixed relatively easily in their storage positions.

In a preferred embodiment, the holding device comprises at least one holding means for storing at least one item of equipment. This is advantageous because the items of equipment to be stored remain in their intended locations on the holding device even during more pronounced vehicle movement, and cannot be damaged as a result of sliding out of place or of colliding with other objects.

In an advantageous improvement of the assembly according to the invention, the holding device may be aligned so as to be essentially perpendicular to a floor of the vehicle, and comprises two opposite surface planes, wherein at least one of the two surface planes comprises at least one holding means for storing at least one item of equipment. In addition, by providing a holding device on perpendicularly held and opposing surface planes, the space requirement of the assembly according to the invention is reduced.

In a favourable embodiment of the assembly according to the invention, the holding device comprises at least one actuating means for pulling out or swivelling out the holding device. The actuation means could, for example, be designed as a handle or a knob; it additionally simplifies the use of the assembly according to the invention.

In an advantageous improvement of the assembly according to the invention, the frame also comprises panel-shaped components, for example sidewalls and a bottom panel, which may have been preassembled to form a frame prior to insertion into the vehicle or into the storage compartment. Preferably, the individual frame components are already equipped with the means for the slidable and/or swivellable storing of holding devices so that installation is simplified.

The frame preferably comprises attachment means in the form of boreholes, which attachment means correspond to boreholes or threaded bushes in the respective storage container. This makes it possible to attach the frame in the storage container by tightening a few screws or by inserting attachment elements having positive fit.

An advantageous improvement of the assembly according to the invention comprises attachment means in the form of turn-lock fasteners so that screwing them down may quickly be effected manually without the use of tools.

In an advantageous embodiment of the assembly according to the invention, the attachment means are provided in the form of snap-in pegs or similar connecting elements having positive fit, which connecting elements by means of simple clipping-in make it possible to rigidly connect the frame in the storage container.

A further advantageous embodiment of the assembly according to the invention is equipped to be placed in a storage compartment. The cabin of a vehicle usually comprises storage compartments that are used for storing baggage or the like. These storage compartments are installed at various locations within the cabin. In order to store the assembly according to the invention, one or several storage compartments may be selected. Since the assembly according to the invention accommodates items of equipment in a particularly space-saving manner, by inserting the assembly in a storage compartment, the space taken up, which is thus not available for baggage and the like, is minimised.

In a particularly preferred embodiment of the assembly according to the invention, the storage compartment taken up may be a hatrack, in which the assembly according to the invention is particularly advantageous. The space taken up may be used particularly effectively, while the stored objects, in particular when the means for slidable or swivellable storing of the holding device is used, are easy to reach without this requiring auxiliary means.

Finally, a particularly preferred embodiment may be used for storing items of emergency equipment. The term "items of emergency equipment" includes a first-aid kit, a medical emergency kit, a defibrillator, respiratory masks, a megaphone, fire-resistant gloves, fire extinguishers, smoke protection hoods, oxygen bottles, emergency transmitters, survival equipment and the like. These objects should be arranged at predefined positions and should be easily accessible. With the use of the assembly according to the invention, items of emergency equipment are stored in a particularly space-saving manner while still being easily accessible.

BRIEF DESCRIPTION OF THE DRAWINGS

Further characteristics, advantages and application options of the present invention are disclosed in the following description of the exemplary embodiments and of the figures. All the described and/or illustrated characteristics per se and in any combination form the subject of the invention, also irrespective of their composition in individual claims or their interrelationship. Furthermore, identical or similar components in the figures have the same reference characters. The following are shown:

DETAILED DESCRIPTION

Figure 1:
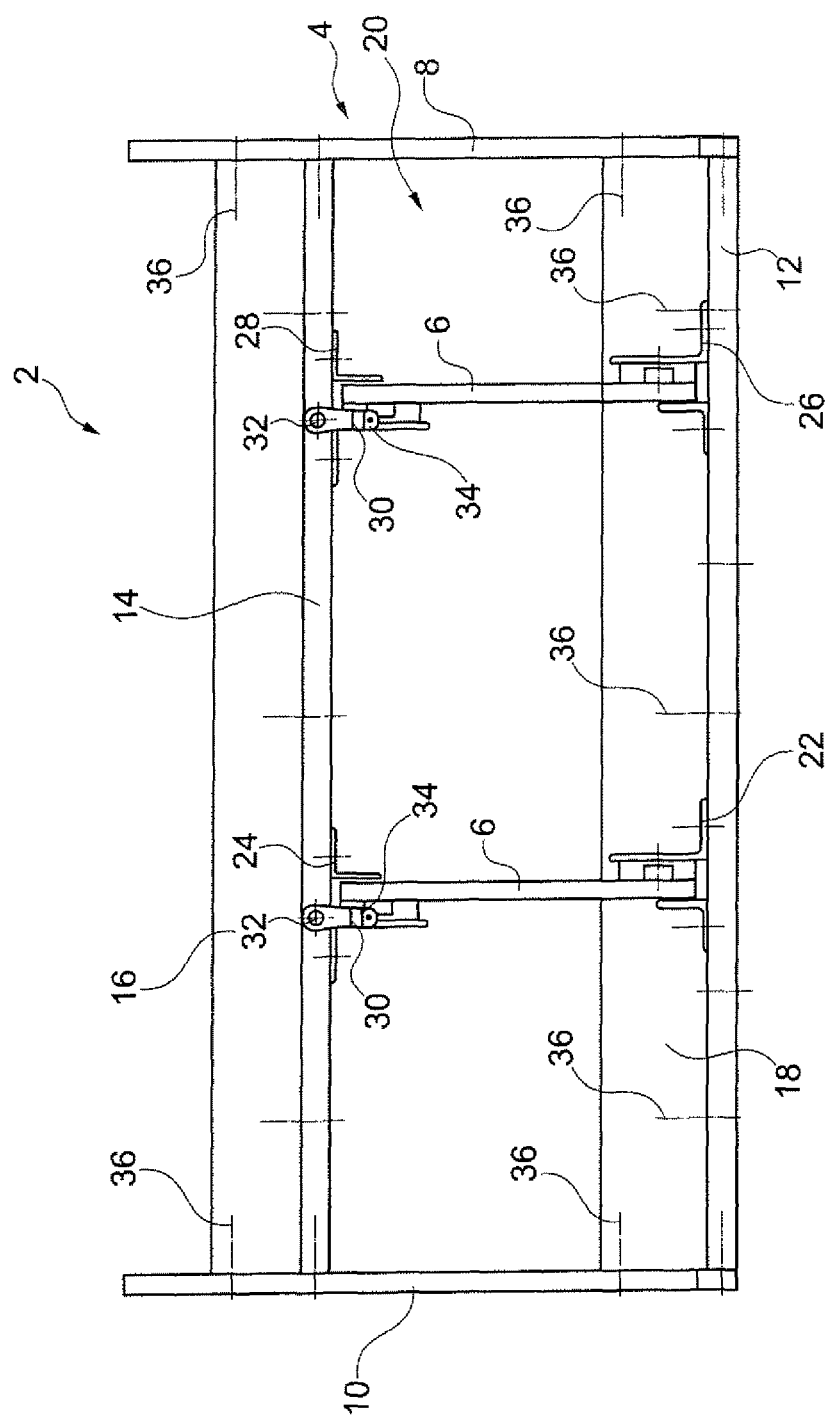
FIG. 1: a front view of the assembly according to the invention.

FIG. 1 shows the assembly according to the invention 2 with a frame 4 and two holding devices 6. The frame 4 has been implemented with the use of two sidewalls 8 and 10 that are screwed to a bottom panel 12, a top delimitation panel 14, a top stiffening panel 16 and a bottom stiffening panel 18. In this arrangement the side panels 8 and 10 are in place so as to be essentially perpendicular to the panels 12 to 18. Between the top delimitation panel 14 and the bottom panel 12 a compartment 20 is formed, in which several linear guides 22 to 28 are installed. In each case two linear guides 22 and 24 or 26 and 28 are arranged opposite each other in the compartment 20 so that in each case a holding device 6 in the form of a pull-out panel may be arranged. These holding devices 6 may be kept in a slid-in position with the use of means for locking down the holding device, which means in the diagram shown in an exemplary manner are designed as rotary-angle-limited locking bars 30. If the holding devices 6 are in the slid-in state so that their front edges do not project beyond the installation space of the assembly 2 according to the invention, the rotary-angle-limited locking bars 30 may be turned on their borehole 32 to the vertical position so that in each case the front end 34 of the locking bars 30 prevents the respective holding device 6 from sliding out. In the case shown in the illustration, the locking bars 30 with their respective front edges 34 keep the linear guide 24 or 28 in its slid-in position.

The holding devices 6 are held by means of two opposite linear guides 22-28; however, it is also imaginable for the upper linear guides 24 and 28 on their own to be sufficient, with the holding devices 6, for the purpose of preventing lateral oscillation movement, to be supported in profiled components that are opposite the linear guides 24 and 28. In order to reduce gliding friction, and thus in order to simplify the pulling-out movement, the linear guides 6 may comprise rollers as are also used, for example, for drawers or the like. Likewise, flat linear guides 6 are also imaginable, which due to advantageous material selection have low-friction characteristics, while at the same time being reliable and requiring little maintenance.

Furthermore, the frame 4 comprises several boreholes 36, which are used to attach the frame 4 in a storage container (not shown). It is not necessary, by means of conventional screw-type connections, to attach the entire frame 4 in a storage container. Instead, particularly advantageous quarter-turn closing pegs are imaginable which in one turn of 90° already achieve adequate attachment. This clearly reduces the effort required to install a frame 4 when compared to conventional attachment methods. It should be noted that any other types of positive-locking or non-positive-locking connection methods may be used to attach the frame 4 in a storage container. For example, locking pins or pegs are imaginable which may be inserted into boreholes 36 and which, having been inserted through corresponding boreholes in the storage container, expand at their ends that have been inserted and pushed through, and in each case with an edge conform to a borehole edge in the manner of a barb.

Figure 2:
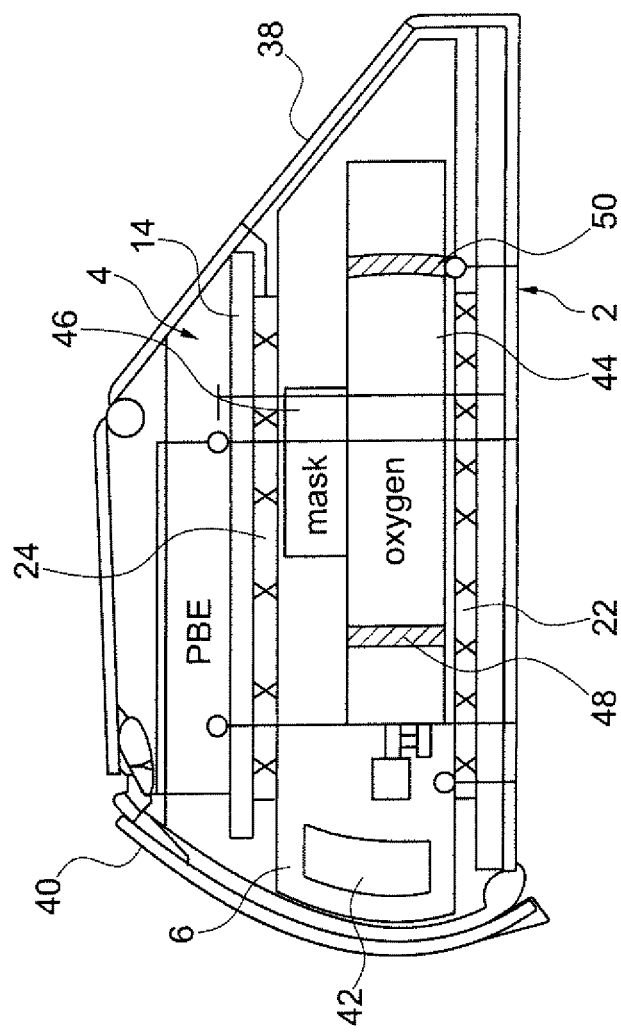
FIG. 2: a lateral section of the assembly according to the invention in the installed state.

The lateral section view of FIG. 2 shows the attachment of the assembly 2 according to the invention in a storage container that has been implemented as a storage compartment 38. The frame 4 is connected to the storage compartment 38 by way of attachment means in the boreholes 36. The front shown in FIG. 1 is shown on the left-hand side in FIG. 2; said front adjoins a closing flap 40 of the storage compartment 38.

This illustration shows an exemplary embodiment of a holding device 6 which for simple pulling-out of the storage compartment 38 comprises a handle 42 which is implemented, for example, as a recess in the panel-shaped holding device 6. The recess is preferably designed so as to be ergonomically favourable so that the holding device 6 may easily be pulled out manually from a storage position.

On the side of the holding device 6, which side is shown in the drawing plane, there are the objects 44 and 46 that are attached to the holding device 6 by way of suitable holding means 48 and 50. The holding means 48 and 50 could, for example, be designed as buckle-like components that make it possible to quickly remove the objects 46 and 48 from the holding device 6. For example, the objects 46 and 48 may form part of emergency equipment on board an aircraft, which emergency equipment serves to provide first aid to a person in the case of emergency. Thus the object 44 might be an oxygen bottle, and the object 46 might be a respirator mask. All the further objects that are necessary as emergency equipment may be arranged on the other side of the holding device 6 shown in FIG. 2, on both sides on the second holding device 6 shown in FIG. 1, and on the top delimitation panel 14.

It is particularly sensible if the two holding devices 6, and preferably also the top delimitation panel 14, may easily be removed from the frame 4 so that during maintenance of the aircraft or during its assembly they may be latched-in to the frame 4 in their already fully-equipped state. This not only obviates the need for attaching them on board the aircraft directly to the storage compartment 38, which would not only tie up service personnel, but would also prolong aircraft downtime.

Figure 3:
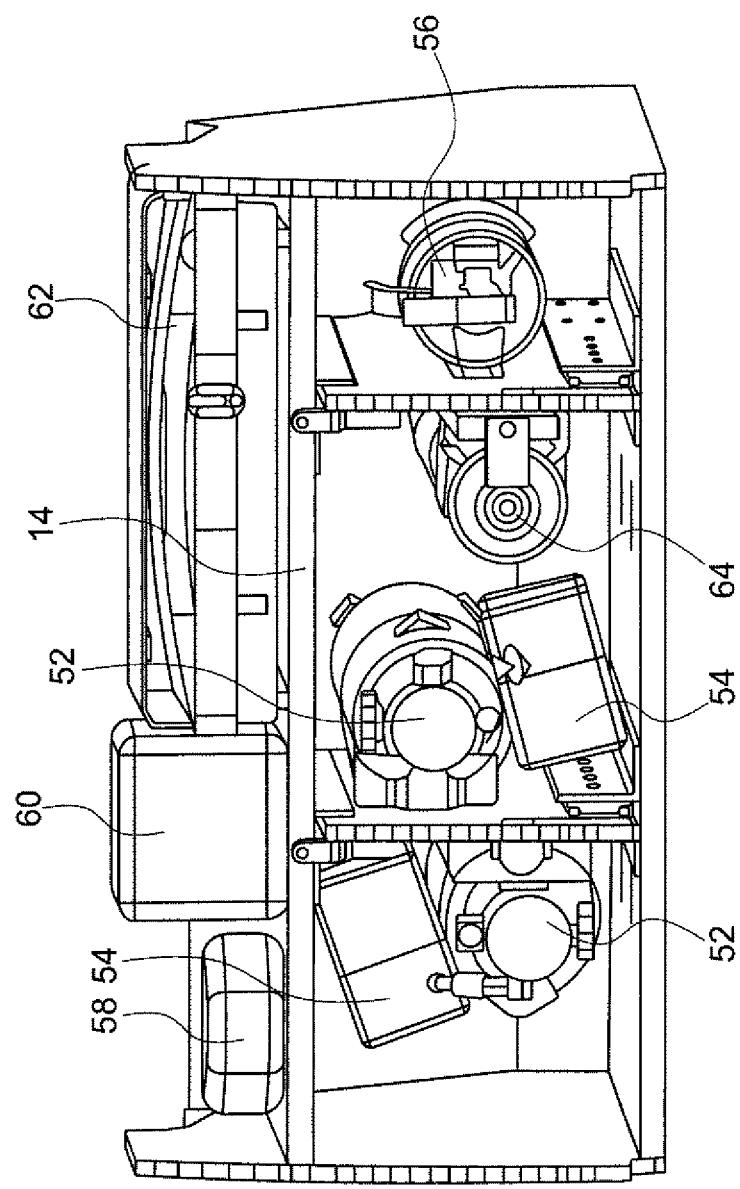
FIG. 3: a three-dimensional view of the assembly according to the invention.

Finally, FIG. 3 shows a three-dimensional view of an exemplary embodiment of the assembly 2 according to the invention, which embodiment also shows two holding devices 6 that are equipped with two oxygen bottles 52, each with a mask 54 or with two fire extinguishers 56. On the top delimitation panel 14 are located, for example, a respirator mask 58, a demo kit 60 (comprising a demo life jacket, demo belt, demo mask and the like), a smoke protection hood 62 and an emergency transmitter 64. The assembly according to the invention may of course be used to accommodate other objects that are not limited to emergency use. Apart from a megaphone, life jackets for children, a baby life raft and the like, it is also possible to store any other objects that need to be made easily accessible to the cabin crew.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

LIST OF REFERENCE CHARACTERS

2 Assembly according to the invention
4 Frame
6 Holding device
8 Sidewall
10 Sidewall
12 Bottom panel
14 Top delimitation panel
16 Top stiffening panel
18 Bottom stiffening panel
20 Compartment
22 Linear guide
24 Linear guide
26 Linear guide
28 Linear guide
30 Locking bar
32 Borehole
34 Front end of the locking bar
36 Borehole of the frame
38 Storage compartment
40 Closing flap
42 Handle
44 Object
46 Object
48 Holding means
50 Holding means
52 Oxygen bottle
54 Mask
56 Fire extinguisher
58 Respiratory mask
60 Demo kit
62 Smoke protection hood
64 Emergency transmitter

The invention claimed is:

1. An aircraft stowage compartment with an assembly for storing objects in the cabin of an aircraft, said assembly comprising:
    at least one frame with at least first and second panels, each panel having at least one linear guide,
    at least one panel-shaped holding device for holding the objects,
    at least one guide device for slidably and/or swivably storing the holding device; and
    at least one lock for locking down the holding device,
    wherein the frame has a contour that, at least in some regions, substantially corresponds to the interior contour of the stowage compartment so that the frame is configured to be arranged in the stowage compartment and to be attached in the stowage compartment by a fastener,
    wherein the holding device is configured to be removably stored in the frame supported by the linear guides of the at least first and second panels, and
    wherein the at least one lock comprises a locking bar rotatable or swivellable on an axis, wherein the locking bar in a lock-down position projects into the slide region or swivel region of the holding device, thereby preventing movement of the holding device.

2. The assembly of claim 1, wherein the holding device is configured to be removed from the frame without the use of tools.

3. The assembly of claim 1, wherein the holding device comprises a panel-shaped component.

4. The assembly of claim 1, wherein the holding device is configured to store at least one item of equipment.

5. The assembly of claim 1, wherein the holding device is aligned so as to be substantially perpendicular to a floor of the vehicle, and comprises two opposite surface planes, wherein at least one of the two surface planes comprises at least one storage compartment for storing at least one item of equipment.

6. The assembly of claim 1, wherein the frame comprises at least one panel-shaped component.

7. The assembly of claim 1, wherein the fastener comprises boreholes provided on the frame.

8. The assembly of claim 1, wherein the fastener comprises a turn-lock fastener.

9. The assembly of claim 1, wherein the fastener comprises a snap-in peg.

10. The assembly of claim 1, wherein the assembly is configured for storing items of emergency equipment.

11. A stowage compartment with an assembly for storing objects in the cabin of an aircraft, said assembly comprising:
    at least one frame with at least first and second panels, each panel having at least one linear guide,
    at least one panel-shaped holding device for holding the objects,
    at least one guide device for slidably and/or swivellably storing the holding device; and
    at least one lock for locking down the holding device,
    wherein the frame has a contour that, at least in some regions, substantially corresponds to the interior contour of the stowage compartment so that the frame can be arranged in the stowage compartment and can be attached in the stowage compartment by a fastener, and
    wherein the holding device can be removably stored in the frame supported by the linear guides of the at least first and second panels,
    wherein the lock comprises a locking bar that is rotatable or swivellable on an axis, and
    wherein the locking bar in a lock-down position projects into the slide region or swivel region of the holding device, thereby preventing movement of the holding device.

* * * * *